United States Patent [19]

Delfosse

[11] 4,204,389
[45] May 27, 1980

[54] MACHINE FOR HARVESTING IN-LINE CROPS

[75] Inventor: Gilbert Delfosse, Avrille, France

[73] Assignee: Braud, Société Anonyme, Angers, France

[21] Appl. No.: 930,402

[22] Filed: Aug. 2, 1978

[30] Foreign Application Priority Data

Aug. 12, 1977 [FR] France ............................... 77 24847

[51] Int. Cl.² ............................................. A01D 46/00
[52] U.S. Cl. ......................................... 56/330; 56/329
[58] Field of Search ....................... 56/328 R, 329, 330

[56] References Cited

U.S. PATENT DOCUMENTS

| | | | |
|---|---|---|---|
| 3,601,965 | 8/1971 | Khessbohrer | 56/330 |
| 3,756,002 | 9/1973 | Mecca | 56/330 |
| 3,768,240 | 10/1973 | Lyon | 56/330 |
| 3,772,866 | 11/1973 | Sell | 56/330 |
| 3,793,814 | 2/1974 | Rohrbach | 56/330 |
| 3,889,454 | 6/1975 | Bruel | 56/330 |
| 4,014,160 | 3/1977 | Mecca | 56/330 |

FOREIGN PATENT DOCUMENTS 501705   4/1976   U.S.S.R. ................................... 56/330

*Primary Examiner*—Russell R. Kinsey
*Assistant Examiner*—Paul J. Hirsch

[57] ABSTRACT

This machine adapted to move on the ground and designed for harvesting in-line crops comprises a frame mounted on wheels and a pair of endless conveyors disposed on either side of the in-line plants to be harvested; the conveyors are movable at a linear velocity substantially equal to that of the machine in operation, and consist each of substantially vertical front and rear runs, of a substantially horizontal bottom run and of a top run; each conveyor consists of a series of transverse buckets and the buckets of the two conveyors have matching end walls for clamping the plants therebetween, the upper run of each conveyor diverging from each other to permit the passage of said plants through the machine.

5 Claims, 6 Drawing Figures

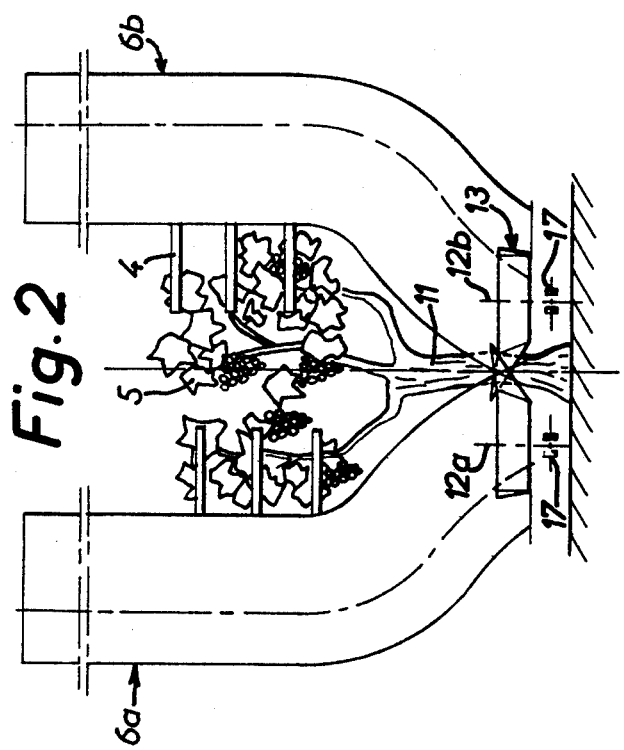
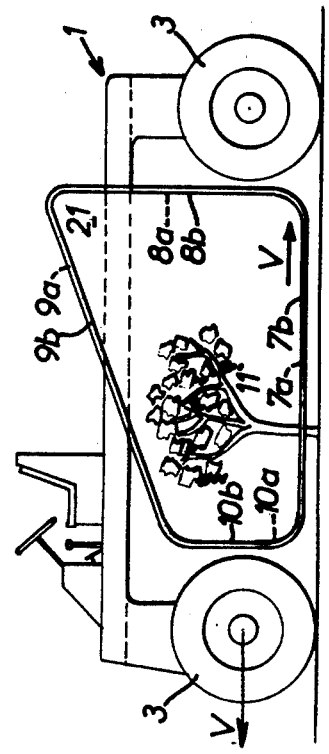
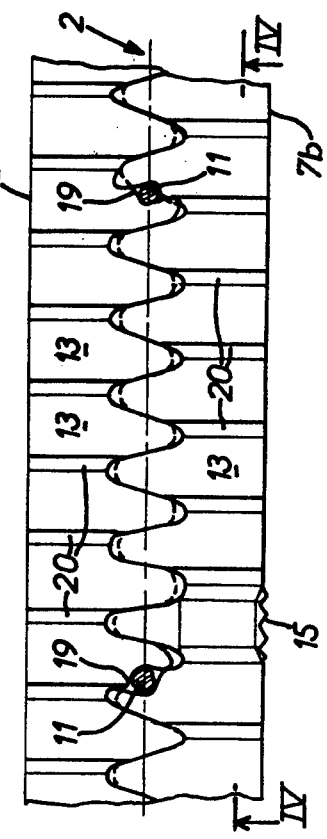
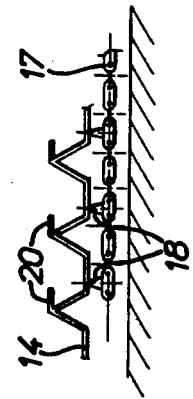

MACHINE FOR HARVESTING IN-LINE CROPS

BACKGROUND OF THE INVENTION

1. Field of the Invention

The present invention relates to agricultural machines and more particularly to a harvesting machine comprising a frame movable in relation to the ground along rows of standing plants, members for picking up the crop from said plants, and at least two conveyors for transferring the crop towards the interior of the machine.

2. Description of the Prior Art

In hitherto known machines of this type, notably grape-gathering machines, sealing members and crop transfer members, such as automatic conveyors, are provided. As a rule, in machines of the above-defined type the sealing members consist of inclined surfaces disposed on either side of the row of plants and fixed in translation in relation to the machine.

Each sealing surface, consisting either of a flexible longitudinal strip or belt, or of a series of rigid retractable plates, engages with its inner edge the lower portion of the plant foot or stem, its outer edge being disposed at a lower level in the vicinity of an automatic conveyor equipping the machine.

The crop gathered from the plants by the corresponding members of the machine, such as beaters, shakers or whips, and more particularly the grapes detached from the vine, drop partially upon said surfaces and slide thereon until they reach one of the conveyors which transfers the crop to a discharge place. As a rule, these conveyors consist of casings in which endless belts are caused to circulate continuously.

These two known systems are attended by the same, multiple inconveniences.

It is obvious that these systems on the one hand cause a permanent wear and tear of the sealing surfaces due to the continuous frictional contact between these surfaces and the lower portion of the plants, and on the other hand have considerable vertical and horizontal dimensions due to the superposition and juxtaposition of the sealing members and transfer members, the latter having in addition a substantial height as a consequence of the superposition of the two runs of the endless belts or like elements.

Moreover, the use of two flexible bands as sealing surfaces is attended, on either side of the fixed obstacles consisting for example of vine-plants, by the formation of longitudinal areas of relatively great amplitude separating the two belts, thus creating particularly detrimental untight spots.

Finally, the construction of sealing surfaces in the form of rigid retractable plates resiliently urged to their closed position and opening when engaged by fixed obstacles is attended by other specific inconveniences, notably a certain complexity and a relatively high cost, with a poor reliability in service due to the distortions and breakages likely to occur in case of fierce shocks against fixed obstacles, a considerable risk of damaging the stems of plants and the impossibility, for a machine engaged along a row of plants, of reversing due to the one-way mode of operation of the plates.

SUMMARY OF THE INVENTION

It is the essential object of the present invention to provide an agricultural machine for harvesting in-line crops or crops arranged in rows, this machine being characterized essentially in that, in comparison with existing machines intended for the same purpose, it reduces very considerably on the one hand the wear and tear of the members or tools engaging the plant stems and on the other hand the over-all dimensions of the machine, both vertically and horizontally or laterally, thus affording an efficient operation in the case of low crops and narrow plantations.

With the machine according to the present invention, especially in its most elaborate form of embodiment, it is possible to avoid all the inconveniences described hereinabove with reference to hitherto known systems.

The machine according to the present invention is characterized essentially in that the conveyors equipping the machine form two vertical loops disposed side by side, each loop comprising a substantially horizontal bottom run, a substantially vertical rear run, an upper run and a substantially vertical front run, in that the bottom runs of the two conveyors are adjacent and guided on either side of a row of plants to be harvested so as to clamp the lower portion or foot of the stem of each plant, gather the crop detached from the plant so that said crop falls directly into said runs, and transfer this crop to the rear of the machine, in that the substantially vertical front and rear runs diverge laterally and upwardly away from each other to permit the passage, through the machine, of the upper portion of the plant, and that the linear velocity of said bottom runs in relation to said frame is equal and opposed to the linear velocity of the machine along the row of plants being harvested.

BRIEF DESCRIPTION OF THE DRAWINGS

A typical form of embodiment of the machine according to the present invention will now be described by way of example with reference to the attached drawing, in which:

FIG. 1 is a diagrammatic and fragmentary side elevational view of the machine during its operation;

FIG. 2 is a fragmentary diagrammatic view of the front portion of the machine, shown on a larger scale;

FIG. 3 is a diagrammatic plane view from above of the bottom runs of the conveyors equipping the machine;

FIG. 4 is a section taken along the line IV—IV of FIG. 3;

DETAILED DESCRIPTION OF THE INVENTION

Figure 5:
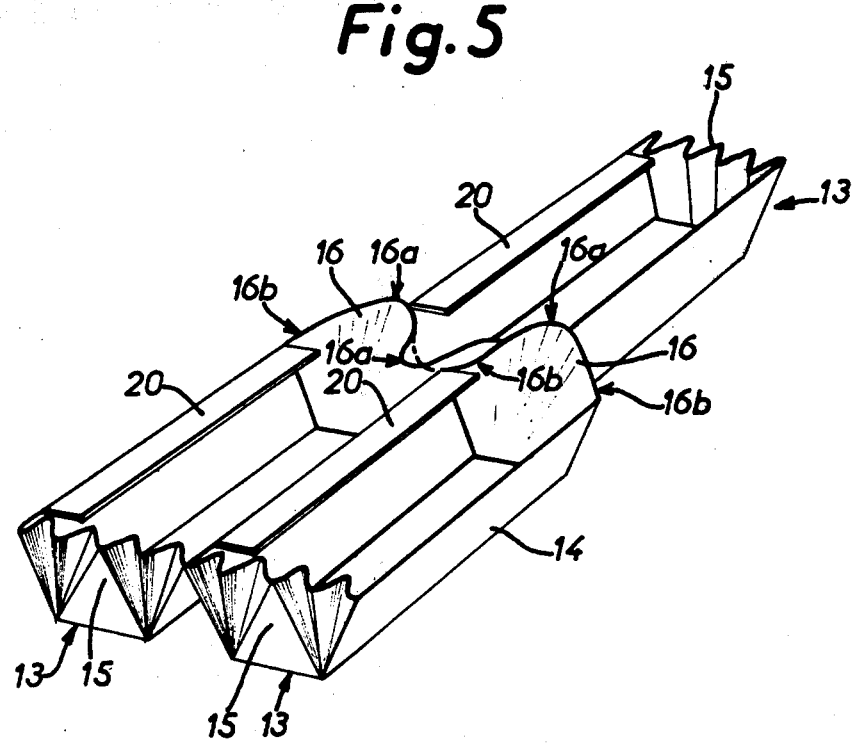
FIG. 5 is a fragmentary perspective view showing on a larger scale elements of the bottom runs of the endless conveyors and FIG. 6 is a plane developed view from above showing on a reduced scale the conveyors of the machine.

The machine according to the invention, intended more particularly for harvesting in-line plants, comprises a conventional frame 1 movable in relation to the ground, along rows 2 of plants or like vegetation, and conveyors 6a, 6b mounted on this frame and adapted to transfer the crop inside the machine, notably into a storage bin.

According to this invention, the conveyors 6a, 6b form a pair of loops disposed substantially vertically side by side and comprising each a substantially horizontal bottom run 7a, 7b, a substantially vertical rear run 8a, 8b, an upper run 9a, 9b and a substantially vertical front run 10a, 10b.

The bottom runs 7a, 7b of conveyors 6a, 6b are adjacent to each other (see FIG. 3) and guided on either side of the row of plants 2 to be harvested so as to clamp the lower portion or stem 11 of each plant (FIG. 2), gather the crop thus detached from the plant 5, so that this crop will fall directly upon these bottom runs 7a, 7b, and eventually transfer this crop to the rear end of the machine. On the other hand, the substantially vertical front and rear runs 10a, 10b and 8a, 8b respectively diverge upwardly and laterally from the vertical axes 12a, 12b of the bottom runs 7a, 7b to clear the passage of the upper portions 5 of the plants through the machine in the longitudinal direction thereof. Finally, the linear velocity V of the bottom runs 7a, 7b in relation to the frame 1 is equal and opposed to the linear velocity of the machine along the row of plants 2. In other words, the movement of conveyors 6a, 6b in space is, according to this invention, kinematically similar to the movement that would be impressed to a pair of driving crawler tracks, if by hypothesis such crawler tracks were provided for driving the machine. This technical result is obtained in a manner known per se by coupling kinematically the conveyor drive members to the locomotion means, in this case wheels 3, or any other suitable servo means.

Each conveyor 6a, 6b comprises preferably a series of separate buckets 13 obtained by transverse folding a flexible, continuous band 14 of suitable material in order to constitute in longitudinal section a regular series of alternate triangles open at the bottom and trapeziums open at the top, as clearly shown in FIGS. 4 and 5, the trapezoidal portions being closed at one end by bellows 15 and at the opposite end by beaks or plain walls 16.

Each series of buckets is fastened to a traction member 17 at spaced fastening points 18 where the bottoms of the buckets are secured to this traction member, the latter consisting for example of a cable, a belt or a chain.

Conveyors thus constructed and consistent with the teachings of the co-pending U.S. Patent Application filed by the Applicant[(s)] for "Conveyor Belt Deformable in Space" may be guided in a conventional manner the description of which is therefore deemed unnecessary.

However, as shown in FIG. 3, the inner edge of the plain end walls or beaks of each conveyor has the shape of a regular broken or undulated line, for example a sinusoidal line, so that the beaks of one conveyor are imbricated between the beaks of the other conveyor.

It is therefore necessary to drive the two conveyors in synchronism in order to preserve this half-bucket shifting between them. This requirement can easily be met, in the known fashion, by means of pinions or gears when the traction member 17 is a chain.

Preferably, the central portion 16a of the beaks is higher, in relation to the bucket bottoms, than the lateral portions 16b of said beaks. Thus, as illustrated in FIGS. 3 and 5, not only the beaks of the conveyor buckets engage the indentations formed between the beaks of the adjacent conveyor, but in addition the central portions 16a of the beaks of each conveyor overlie the gaps or lateral portions formed between the beaks of the other conveyor, so that no clearance is left between the two conveyors when no plant or like obstacle is present between the conveyors.

When such plant or like obstacle is engaged between the two conveyors, notably in the case of the stem or foot 11 of a plant, the beaks undergo a distortion and move away from each other, but the clearance 19 thus produced therebetween is very moderate and does not constitute a detrimental lack of tightness.

With this arrangement it is thus possible, when the two bands 13 are again joined at the front of the machine, to obtain a perfect coupling or intermeshing engagement between the inner contours of these bands, each beak 16 engaging the cavity formed between the two adjacent beaks of the adjacent band to provide a meshing engagement similar to that of bevel gears.

Transverse lips or ledges 20 are provided for partially closing the tops of the buckets and permitting a vertical transfer of the crop.

The crop falling upon the bottom runs 7a, 7b is transferred at the velocity of travel of the machine firstly to the rear of the latter and then vertically upwards by the substantially vertical rear runs 8a and 8b. In the vicinity of the turning section 21 of the bucket loops a hopper or a transverse conveyor (not shown) is provided for either storing, or another transfer of, the crop.

Figure 6:
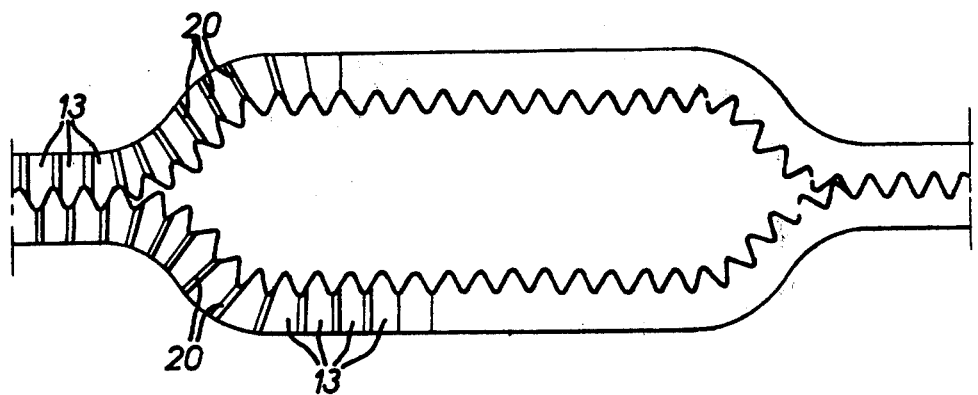

It may prove advantageous, especially in the case of low plants, to arrange the assembly in such a manner that the substantially vertical front and rear runs 10a, 10b and 8a, 8b depart from the vertical axes 12a, 12b of the bottom runs only at their lower portions, as shown diagrammatically in FIGS. 2 and 6.

In this last instance, the conveyors 6a, and 6b following a path having a radius of curvature in a longitudinal plane (i.e. the plane of FIG. 1) and another radius of curvature in a transverse plane (the plane of FIG. 2) will consist each, preferably, of the buckets described hereinabove and associated with a chain 17 of the so-called "universal deflection" type, i.e. provided with pivot points having alternate axes perpendicular to each other.

Of course, it would not constitute a departure from the basic principles of this invention to bring various modifications and changes to the specific form of embodiment shown and described herein, as will readily appear to those conversant with the art.

What is claimed as new is:

1. A machine for harvesting in-line crops, comprising a frame movable in relation to the ground along rows of plants, means for separating the crop from the plants, and at least two conveyors for transferring the crop inside the machine which form a pair of closed loops disposed side by side, each conveyor comprising a substantially horizontal bottom run, a substantially upright rear run and a substantially upright front run, and a top run, said bottom runs of the two conveyors being disposed adjacent to each other and guided on either side of a row of plants in order to clamp said plants of said row at the lower portion of the stems thereof, to gather the detached crop so that the latter falls directly upon said bottom runs, and to transfer said crop to the rear of the machine, the upright runs of each conveyor departing laterally and outwardly of the machine in relation to the vertical plane passing through the longitudinal axis of the corresponding bottom run only in the lower portions of said upright runs and being substantially vertical in their upper portions to form non-planar loops, the linear velocity of said bottom runs in relation to said frame being opposed and substantially equal to the linear velocity of travel of the machine along said row of plants.

2. A harvesting machine for in-line crops, comprising a frame structure movable in relation to the ground along rows of plants, members for detaching the crop from the plants, and at least two conveyors for transferring the crop to the inside of the machine, said conveyors forming two upwardly extending loops disposed side by side and having each a lower, substantially horizontal run, a rear upright run, a top run and a front upright run, the lower runs of the two conveyors being adjacent to each other and guided on either side of a row of plants in order to encompass this row of plants at the base thereof to pick up the detached crop falling directly by gravity into the lower runs and to transport said crop to the rear of the machine, the top run of each conveyor being set off laterally and outwardly of the machine with respect to the vertical plane passing through the longitudinal axis of the corresponding lower run, and the linear velocity, in relation to the frame structure, of the lower runs being opposed and substantially equal to the velocity at which the machine is driven along the plant row, said conveyors being in the form of non-planar loops and comprising an assembly of juxtaposed buckets each bucket of a conveyor being provided with an extension in the form of a flexible plant engaging convex shaped wall extending upwardly and inclined away from the bottom of the bucket and directed towards the other conveyor, said flexible walls having between the same pitch in both conveyors, and the linear movements of the two conveyors being synchronized so that the flexible walls of each conveyor are imbricated between those of the other conveyor.

3. A harvesting machine as claimed in claim 2, wherein the flexible walls of the two conveyors are at a higher level in the vicinity of their central portion than the vicinity of their lateral portions, whereby the central portions of the flexible walls of each conveyor overlie the lateral portions of the flexible walls of the other conveyor.

4. A machine for harvesting in-line crops, comprising a frame movable in relation to the ground along rows of plants, means for separating the crop from the plants, and at least two conveyors for transferring the crop inside the machine which form a pair of closed loops disposed side by side, each conveyor comprising a substantially horizontal bottom run, a substantially vertical rear run and a substantially vertical front run, and a top run, said bottom runs of the two conveyors being disposed adjacent to each other and guided on either side of a row of plants in order to clamp said plants of said row at the lower portion of the stems thereof, to gather the detached crop so that the latter falls directly upon said bottom runs, and to transfer said crop to the rear of the machine, the top run of each conveyor being shifted laterally and outwardly of the machine in relation to the vertical plane passing through the longitudinal axis of the corresponding bottom run, the linear velocity of said bottom runs in relation to said frame being opposed and equal to the linear velocity of travel of the machine along said row of plants, wherein at least the upper portions of said front and rear runs are substantially vertical, each conveyor comprising a series of elongated buckets having their major dimensions perpendicular to the longitudinal axis of the conveyor, each bucket having a plant engaging convex shaped wall, said wall extending upwardly and inclined away from the bottom of the bucket and facing the opposite conveyor, said walls of one conveyor having the same pitch as those of the opposite conveyor, the linear movements of the two conveyors being synchronized so that said walls of one conveyor engage the indentations formed between adjacent walls of the other conveyor, and the said walls of the two conveyors having a higher level in the vicinity of their central portion than in the vicinity of their lateral portions, so that the central portions of said walls of each bucket overlie the lateral portions of said walls of the other conveyor.

5. A machine as claimed in claim 4, wherein a traction member in the form of a chain is provided for driving the conveyors.

* * * * *